June 7, 1949.  G. F. ESSON  2,472,744
MACHINE TOOL
Filed March 29, 1944  4 Sheets-Sheet 1

INVENTOR.
GORDON FORBES ESSON
BY
ATTORNEY

June 7, 1949.　　　　　G. F. ESSON　　　　　2,472,744
MACHINE TOOL
Filed March 29, 1944　　　　　　　　　　　　　4 Sheets-Sheet 2

INVENTOR.
GORDON FORBES ESSON
BY
ATTORNEY

June 7, 1949.  G. F. ESSON  2,472,744
MACHINE TOOL
Filed March 29, 1944  4 Sheets-Sheet 3

INVENTOR.
GORDON FORBES ESSON
BY
ATTORNEY

June 7, 1949. G. F. ESSON 2,472,744
MACHINE TOOL
Filed March 29, 1944 4 Sheets-Sheet 4

INVENTOR.
GORDON FORBES ESSON
BY
ATTORNEY

Patented June 7, 1949

2,472,744

UNITED STATES PATENT OFFICE 2,472,744

MACHINE TOOL

Gordon Forbes Esson, Detroit, Mich., assignor to Ex-Cell-O Corporation, Detroit, Mich., a corporation of Michigan Application March 29, 1944, Serial No. 528,647

3 Claims. (Cl. 77—32).

This invention relates generally to that class of devices known in the art as "drill units" which are frequently mounted on a machine base (not shown) in association with a work holder (not shown) to constitute a machine tool for the performance of cutting operations.

More particularly such drill units are used for rotating and axially moving a tool such as is used for drilling, reaming or tapping in a cycle including first, a cutting stroke, and subsequently, a retracting or return stroke.

One object of the invention is to provide a unidirectionally rotatable means for causing reversible axial movement of a cutting tool responsive to a reciprocating piston means while constant rotation of the tool is maintained by a unidirectional driving means.

Other objects and advantages of the invention will more fully appear from the following description taken in connection with the accompanying drawings, in which.

Figure 1:
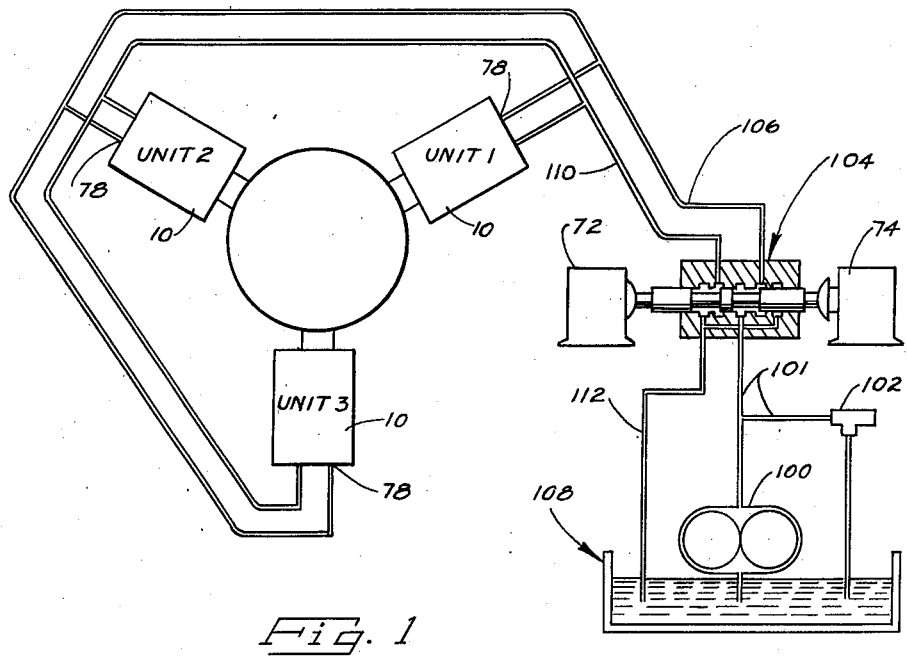
Fig. 1 is a diagrammatic illustration of a plurality of units.

Referring to the drawings and particularly to Figs. 3 to 8 inclusive, the unit includes a housing 10 on which is mounted a motor 12 arranged to drive a pulley 14 through belt 14a which rotates internally splined, hollow shaft 16 in bearings 18. Bearings 18 are fastened in rear sleeve 20a which is fixed in the inward end of stepped bore 19 in housing 10. These bearings prevent axial movement of shaft 16 relative to the housing. The forward (leftward in Fig. 3) end of the bore 19 supports an axially slidable but non-rotatable quill 20 having a central shaft 22 axially movable therewith and rotatable therein on bearings 24. This shaft has at its leftward or forward end a chuck or like device 21 for holding a rotatable cutting tool such as a drill, reamer, etc. and at its opposite end a splined shaft extension 26 engaging the internally splined portion of shaft 16 enabling the shaft 26 to be rotationally driven thereby while being axially moved in relation thereto with reciprocation of the quill 20.

About midway of the length of the quill, its housing member 20 is provided with oppositely extending trunnion members 28, 30 firmly fixed thereto and having cylindrically formed journal portions 32 encompassed by bearing blocks 34 held thereon by shoulders 36. The bearing blocks have parallel opposed faces 38 (Fig. 6) adapted to slide in the two open ended slots 40 of a yoke member 42 which is pivoted as at 44 and may be rotated thereabout by interaction of a cam follower roller 46 and the cam 50. Roller 46 is mounted about midway of yoke 42 by a suitable stud 48. A spring 52 (Figs. 3 and 5), which has its fixed end attached in housing 10 as at 53, and its movable end attached to the outwardly extending end of trunnion 30, constantly urges yoke 42 to rotate in a clockwise direction (see Fig. 6) about its pivot 44 and likewise urges quill 20 toward its retracted or withdrawn position.

Figure 6:
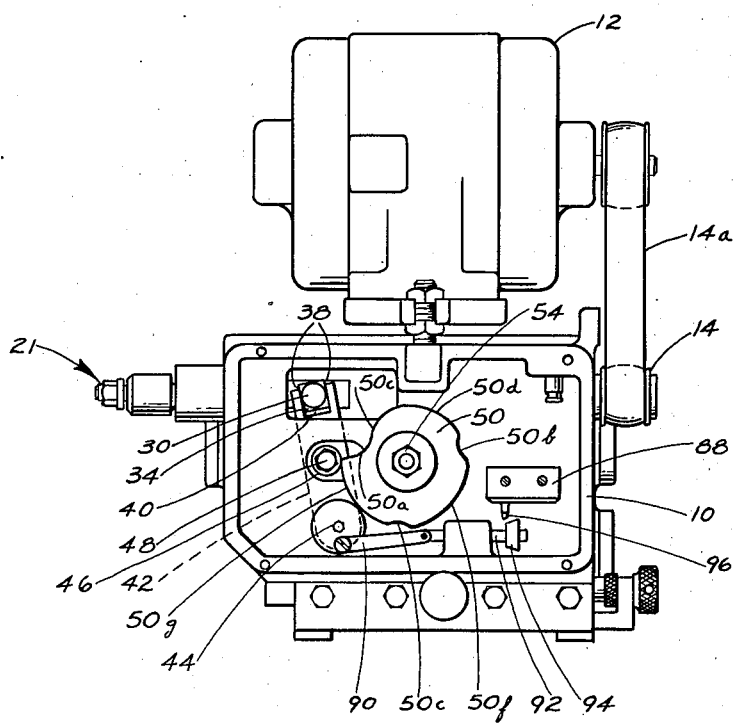
Fig. 6 is a side elevational view of the unit shown in Fig. 4, with cam cover plate removed.
Figure 7:
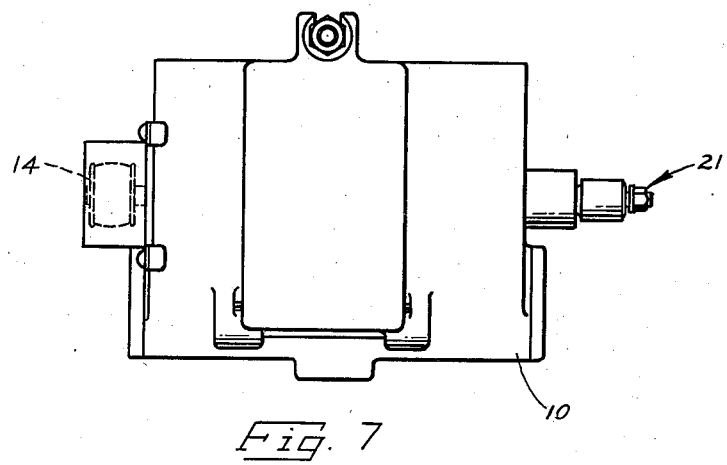
Fig. 7 is a top plan view of the unit with driving motor removed and with a belt guard.
Figure 8:
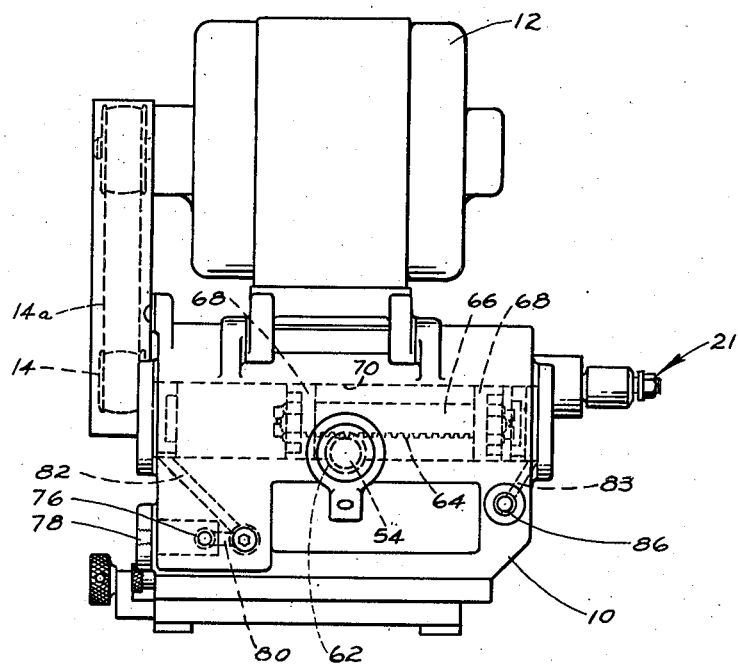
Fig. 8 is a side elevational view opposite to that shown in Fig. 6 with belt guard in place.

Cam 50 is mounted on cross shaft 54 which is rotatably supported on needle bearings 56 received in a stepped cross bore 58 formed in housing 10. When shaft 54 is rotated in a counter clockwise direction (as seen in Fig. 6), a conventional overrunning or one-way driving clutch including roller 60 causes cam 50 to move with the shaft; however, when shaft 54 moves in a clockwise direction, especially after cam follower roller 46 has passed over the drop-off portion 50a of cam 50 allowing the quill 20 to be retracted to its innermost position, cam 50 will not move with any clockwise movement of shaft 54.

Shaft 54 is formed adjacent the end opposite to that supporting the cam 50 (Fig. 5) with pinion teeth 62 (Fig. 8) which are engaged by rack teeth 64 formed on a member 66 which has at either end oppositely facing pistons 68 arranged to be moved in rightward or leftward direction, in their surrounding bore 70, which is formed in housing 10, by alternative application of fluid pressure on their opposed outer faces.

The source of fluid pressure as best seen in Fig. 1 may conveniently be the conventional constant displacement pump 100 discharging into a branched conduit 101 having associated therewith a conventional pressure relief valve 102 and in association also with a conventional three position reversing valve 104 which is adapted to connect pressure conduit 101 or exhaust conduit 112 alternatively to conduits 106 or 110. In the instance shown, valve 104 may be placed in one extreme position by energization of solenoid 72 causing fluid pressure to be applied to the left face (Fig. 8) of piston 68 through branched conduit 106 while the right face of piston 68 on the opposite end of the rack 66 is relieved to the supply tank 108 through the branched conduit 110 thus causing the quill 20 to be advanced until cam 50, in its contact with roller 46, has passed the drop-off point 50a causing quill 20 to retract to its innermost position under the action of spring 52. Upon energizing solenoid 74 (and deenergizing solenoid 72), fluid pressure is applied to the right face of piston 68 through conduit 101, the left face being relieved to the supply tank, pistons 68 and rack 66 are caused to excecute a recovery stroke without movement of cam 50 or quill 20.

The rate of pressure fluid displacement to the leftward or feeding face of piston 68 is controlled by an adjustable orifice 76 which controls the flow area in the path of pressure fluid entering the housing 10 at 78 from conduit 106. Entry 78 communicates internally of housing 10 with branched passage 80 and after passing the adjustable orifice 76, which may be of any conventional sort, passes into branched passage 82.

It is here to be noted that, during in-flow at entry 78, the pressure in passage 80 tending to seat ball check 84 in addition to the downward force of its associated spring 85, is always greater than the lifting pressure in passage 82 causing all fluid which reaches passage 82 to have first passed restricted orifice 76. The reduced pressure of passage 82, which is then applied on the feeding face of piston 68, may therefore, be controlled to cause the forward stroke of piston 68 and quill 20 to be accomplished at the desired velocity. During the last described movement of piston 68, the exhaust fluid displaced by its advancing rightward face flows through passage 83 (Fig. 8) and port 86, both formed in housing 10, into conduit 110, through valve 104, and exhaust conduit 112 to the supply tank.

When the valve 104 is reversed by energizing solenoid 74 and deenergizing solenoid 72, presure fluid from branched conduit 101 is admitted to conduit 110 and to the right face of piston 68 causing leftward movement thereof. The exhaust fluid displaced by the leftward advancing face of piston 68 is forced into passage 82 from which a negligible portion thereof may move through restricted orifice 76, passage 80 and port 78, through branched conduit 106, valve 104 and exhaust passage 112 to the supply tank. However, by far the greater portion of the exhaust fluid displaced by the advancing face of piston 68 bypasses the orifice 76, virtually without restriction, by lifting the check valve 84 and after traversing passage 80 returns to the supply tank through the path previously traced. It may, therefore, be seen that the forward or feeding stroke of the pistons 68 and the quill 20 is always accomplished at a controlled rate as determined by the adjustment of orifice 76, and the return stroke of the quill 20 takes place at relatively rapid velocity due to the drop-off portion 50a of cam 50 while pistons 68 and cam 50 are still moving in their forward or feeding direction. Cam 50 in normal operation never has a reverse or recovery movement but, because of the one-way clutch including driving roller 60 and the bypassing of orifice 76 when valve 104 is reversed, the recovery stroke of pistons 68, which may not be instituted until an appreciable time after quill 20 has executed its retractive stroke, may be accomplished at a rapid rate in relation to its forward feeding movement.

Cam 50, which may be of any desired shape is, in Fig. 6, shown of a shape which is advantageous for the performance of deep drilling operations. During the passage of a relatively quick rise portion 50c in contact with the follower roller 46, the point of the drill (not shown) is rapidly brought into proximity with the workpiece (not shown). During passage of the next slow rise portion 50d over the roller 46, the tool is advanced into the work at a feeding speed. When the depression 50b contacts the roller, the drill is retracted a predetermined amount for a brief time to cause the drill chip to be discontinuous and to allow the previously formed chip to be cleared from the drilled hole by translating action of the spiral flutes of the drill (not shown). While the cam follower 46 contacts successively the portions of the cam numbered 50f, 50c, and 50g, the drill is given respectively an axial advance at feeding speed, a second chip breaking retraction and a final infeeding movement to its ultimate depth which is completed just before the drop-off portion 50a causes the complete retractive stroke. These last said movements are accomplished while the feed control pistons 68 are still moving at controlled speed in a forward direction and, as pointed out in a later illustration, this construction gives rise to a unique advantage when a multiplicity of drilling units is required to operate simultaneously as a singly controlled group though the duration of their several cutting traverses may not be exactly coextensive.

To enable a multiplicity of units to be simultaneously operated and controlled by one electric circuit common to all, each unit contains a limit switch 88 which may be operated as shown in Fig. 6 by a connecting rod 90 pivoted at one end to yoke 42 below its point of oscillation 44 and at the opposite end to rod 92 being thus adapted to reciprocate the rod 92 and its conically formed operator 94 which lifts switch plunger 96 closing the said switch when the quill 20 is in its fully retracted position and allowing the switch to remain open otherwise. The limit switches 88 of Fig. 6 are indicated respectively for the three units 1, 2, 3 of Fig. 1 by the series connected switches LS1, LS2, LS3 of Fig. 2.

Figure 2:
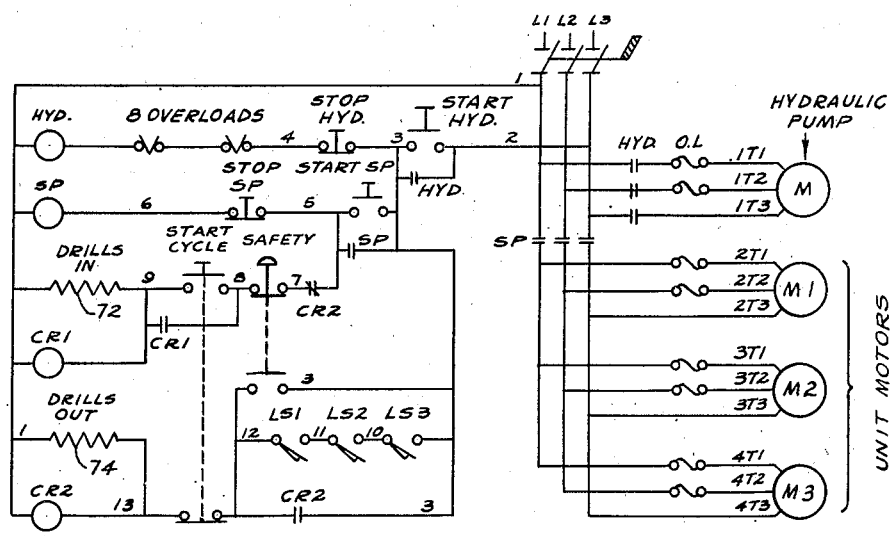
Fig. 2 shows a wiring diagram for supplying and controlling energy to rotate the tools of a multiplicity of electric motor driven units and to drive the pump which supplies the hydraulic fluid pressure for reciprocating the tools.
Figure 3:
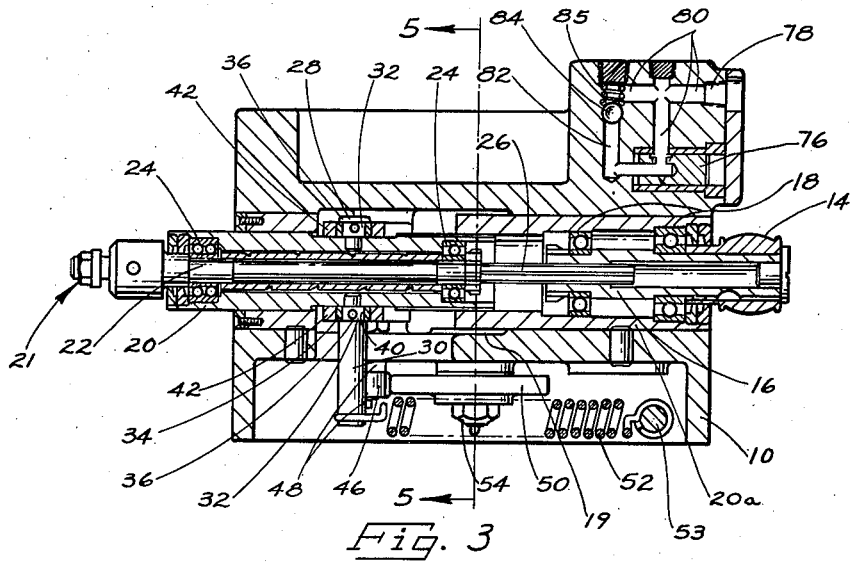
Fig. 3 is a horizontal sectional view with cam cover plate removed, taken on line 3—3 of Fig. 4 of one of the units.
Figure 4:
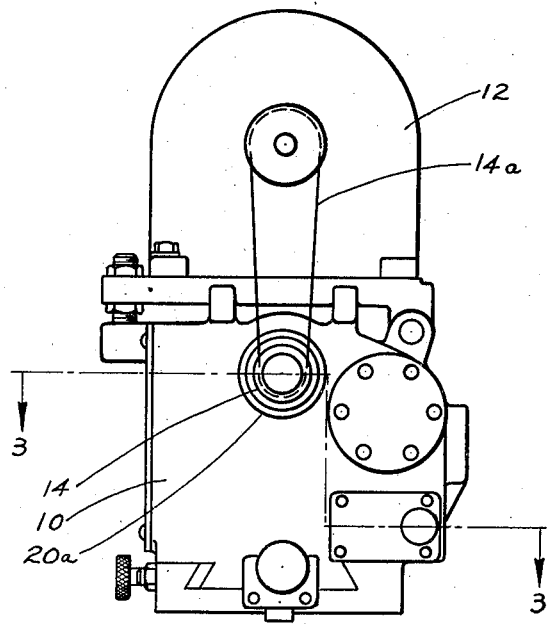
Fig. 4 is an end view of the unit shown in Fig. 3.
Figure 5:
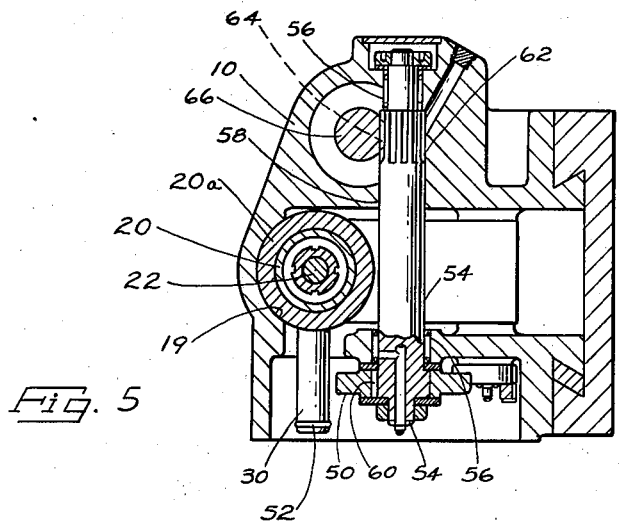
Fig. 5 is a transverse sectional view taken on line 5—5 of Fig. 3.

The unitary control of a multiplicity of units may well be illustrated by Figs. 1 and 2 in which the pump 100 of Fig. 1 is driven by the motor M of Fig. 2 and units 1, 2, and 3 of Fig. 1 are respectively driven by M1, M2, and M3 of Fig. 2. After closing the main switch of Fig. 2 connecting the lines L1, L2, L3 to the supply, the circuit is conditioned for operation. The hydraulic pump motor M may then be started by momentarily depressing the Hyd. start button connecting lines 2, 3. A circuit is then completed energizing the solenoid HYD via conductors 1, 4, 3, 2. The last named solenoid closes all normally open contactors identified by HYD and starts hydraulic pump motor M which drives pump 100 supplying pressure through conduit 101 to valve 104. The connection of conductors 2, 3, as by closing of the sealing contactor HYD, is a prerequisite to starting the several respective unit driving motors M1, M2, M3 by momentarily depressing the Start sp. button completing a circuit through solenoid SP via conductors 1, 6, 5, 3 (which last has previously been connected to 2 as before mentioned). Upon energizing solenoid SP in this manner the sealing contactor SP maintains contact between conductors 3, 5 and closes the three contactors SP energizing motors M1, M2, M3.

The last described step is prerequisite to starting a cycle including infeeding and return movements of the several units 1, 2, 3 which may be done by momentarily closing the normally open Start cycle button adapted to join conductors 8, 4. The first effect of depressing this button is to open the lower contacts of the normally closed manually operable contactor which opens the circuit through which solenoid CR2 is energized at the end of the retraction stroke of the quills 20 of the several units. This circuit may be traced through 1, CR2, 13, 12, the three closed limit switches LS1, LS2, LS3, 3 and 2. Upon opening the contact between 12, 13, both CR2 and the Drills out solenoid 74 controlling the valve 104 are deenergized in preparation for energization of the Drills in solenoid 72 which will take place in the following manner.

Upon deenergizing solenoid CR2, its normally closed contactor CR2 falls closed joining 5 (which is already hot) to 7 which is connected to 8 through the normally closed Safety contactor. Closure of the manual contactor joining 8, 9 energizes solenoid CR1 and Drills in solenoid 72 shifting the valve 104 to start the cycle of the units 1, 2, 3. Energization of solenoid CR1 closes sealing contactor CR1 so that connection between 8, 9 is maintained after the Start cycle button is released. Immediately upon start of the several units on their feeding strokes the respective limit switches LS1, LS2, LS3 drop open, but as the several units reach the forward extremity of axial travel of their respective quills 20 and are retracted into their rearmost positions by their springs 52 after their cams 50 have passed the drop-off point 50a, the respective limit switches LS1, LS2, LS3 are closed in the order determined by the respective durations of the feeding movements of the several units. With the closing of the last of these limit switches, circuit is established from 1 through Drills out solenoid and solenoid CR2 via 13, 12, 11, 10, 3. The normally closed contactor CR2 which has connected 5, 7 is then opened deenergizing the Drills in solenoid and CR1. Valve 104 is thereby shifted into the position to cause return of all pistons 68 and the units will then remain at rest, in so far as axial movement of their quills is concerned, until the Start cycle button is again depressed.

At any time during a feeding stroke all units may be retracted by depression of the Safety button which has an effect similar in all control respects to the closure of the last of the three limit switches LS1, LS2, LS3 above described. However, in the event of reversing pistons 68 before cam 50 has passed the drop-off point, the cams 50 will normally, under the influence of spring 52 and due to their shape which results in forward movement of yoke 42 with forward movement of the cam, roll backward with backward movement of shaft 54, this emergency retraction occasioning the only circumstance under which cam 50 has any reverse rotation.

It is also to be seen that upon depression of the Stop sp. button, the spindle driving motors M1, M2, M3 will be stopped and both solenoids 72 and 74 will be deenergized. The valve 114 will then centralize preventing axial travel of the quills 20 in either direction. Substantially the last said occurrence will be experienced upon opening of any one of the several (eight) overload protective devices in the circuit including the Stop hyd. button with the exception that the hydraulic pump motor will also stop.

It will be understood that many modifications and alternative constructions exemplified by the embodiment herein described may be made without departing from the spirit of my invention and it is my intention not to limit the scope thereof except as the same is defined in the appended claims.

I claim as my invention:

1. A machine tool having, in combination, a rotatable and axially shiftable tool supporting spindle, spring means yieldably urging said spindle toward a retracted position, power actuated means for advancing said spindle in a feeding movement and for releasing the spindle for return by said spring means, said power actuated means including a cam having a gradually sloping surface for effecting the feed of the spindle, said surface terminating in an abrupt drop-off to permit rapid return of the spindle by said spring means, a follower operatively associated with said spindle for shifting movement therewith and engageable by said cam for shifting said spindle in opposition to said spring means, a shaft rotatably supporting said cam, a rack member supported for reciprocation transversely of said shaft, a pinion rigid with said shaft and coacting with said rack, cylinder and piston means reversibly operable in a forward stroke at an adjustable slow speed and in a return stroke at a relatively rapid speed for reciprocating said rack to rotate said shaft alternately in opposite directions, means providing a one-way driving connection between said shaft and said cam to effect positive rotation of said cam and said shaft in one direction in synchronism with said forward stroke of said cylinder and said piston means, and to permit reverse rotation of the shaft during the return stroke of said cylinder and piston means to normal rest position while said cam remains stationary, and control means operable as said cam drop-off moves past said follower and in response to the return of said spindle to effect reversal of said cylinder and said piston means at the end of said forward stroke.

2. A machine tool having, in combination, a rotatable and axially shiftable tool supporting spindle, spindle retracting means, cam means including a rotatable cam and a separable follower associated with said spindle for advancing the spindle and maintained in cooperative engagement by said retracting means, said cam being shaped to impart to the spindle an initial rapid advancing movement and a subsequent slower feeding movement followed by the release of the spindle for rapid return by said retracting means, pressure fluid actuated means for rotating said cam in one direction only continuously through one revolution to effect the foregoing sequence of spindle movements, said pressure fluid actuated means comprising a shaft rotatably supporting said cam, reversible cylinder and piston means operative in a forward stroke to rotate said shaft in one direction and alternately in a return stroke to rotate said shaft in the opposite direction, and clutch means operative to drivingly connect said shaft to said cam when the shaft is rotated in one direction and to release the shaft from the cam when the shaft is rotated in said opposite direction, and means responsive to the return of said spindle for effecting reversal of said cylinder and piston means at the end of said forward stroke.

3. A machine tool having, in combination, a rotatable and axially shiftable tool spindle, means yieldably urging said spindle toward a retracted position, pressure fluid actuated means for advancing said spindle in a feeding movement and for abruptly releasing the spindle for rapid return by said retracting means, said pressure fluid actuated means including a reciprocatory fluid motor, a shaft continuously rotated in synchronism with the movement of and alternately in opposite directions by said motor, a cam rotatably supported on said shaft and adapted to coact with a follower associated with said spindle, and means operative to drivingly connect said shaft and said cam for joint rotation when the shaft is rotated in one direction and to interrupt the connection when the shaft is rotated in the opposite direction.

GORDON FORBES ESSON.

REFERENCES CITED

The following references are of record in the file of this patent:

UNITED STATES PATENTS

| Number | Name | Date |
|---|---|---|
| 472,942 | Crawford et al. | Apr. 17, 1892 |
| 1,764,098 | Galloway | June 17, 1930 |
| 1,822,690 | De Leeuw | Sept. 8, 1931 |
| 1,831,547 | Scholl | Nov. 10, 1931 |
| 1,841,546 | Millholland | Jan. 19, 1932 |
| 1,975,250 | Calpha et al. | Oct. 2, 1934 |
| 2,274,226 | Wiedmann | Feb. 24, 1942 |
| 2,367,593 | McKee et al. | Jan. 16, 1945 |

FOREIGN PATENTS

| Number | Country | Date |
|---|---|---|
| 55,472 | Germany | Feb. 28, 1891 |
| 445,527 | Germany | June 9, 1927 |